(12) United States Patent
Kodama et al.

(10) Patent No.: US 11,520,745 B2
(45) Date of Patent: Dec. 6, 2022

(54) DISTRIBUTED STORAGE DEVICE AND DATA MANAGEMENT METHOD IN DISTRIBUTED STORAGE DEVICE

(71) Applicant: HITACHI, LTD., Tokyo (JP)

(72) Inventors: Tomoyuki Kodama, Tokyo (JP); Mitsuo Hayasaka, Tokyo (JP); Yuto Kamo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 17/182,316

(22) Filed: Feb. 23, 2021

(65) Prior Publication Data

US 2021/0374105 A1    Dec. 2, 2021

(30) Foreign Application Priority Data

May 27, 2020    (JP) .............................. JP2020-092660

(51) Int. Cl.
*G06F 16/182* (2019.01)
*G06F 16/174* (2019.01)
*G06F 16/17* (2019.01)
*G06F 16/172* (2019.01)

(52) U.S. Cl.
CPC ........ *G06F 16/1748* (2019.01); *G06F 16/172* (2019.01); *G06F 16/1727* (2019.01); *G06F 16/182* (2019.01)

(58) Field of Classification Search
CPC ............... G06F 16/1748; G06F 16/172; G06F 16/1727; G06F 16/182; G06F 16/152
USPC ......................................................... 707/692
See application file for complete search history.

(56) References Cited

U.S. PATENT DOCUMENTS

| | | | |
|---|---|---|---|
| 2012/0191912 A1* | 7/2012 | Kadatch | G06F 11/1076 711/119 |
| 2014/0280664 A1 | 9/2014 | Sengupta et al. | |

* cited by examiner

*Primary Examiner* — Hicham Skhoun
(74) *Attorney, Agent, or Firm* — Volpe Koenig

(57) ABSTRACT

The number of inter-node communications in inter-node deduplication can be reduced and both performance stability and high capacity efficiency can be achieved. A storage drive of storage nodes stores files that are not deduplicated in the plurality of storage nodes, duplicate data storage files in which deduplicated duplicate data is stored, and cache data storage files in which cache data of duplicate data stored in another storage node is stored, in which when a read access request for the cache data is received, the processors of the storage nodes read the cache data if the cache data is stored in the cache data storage file, and request another storage node to read the duplicate data related to the cache data if the cache data is discarded.

14 Claims, 14 Drawing Sheets

FIG. 4

| OFFSET | SIZE |
|--------|------|
|        |      |
|        |      |
| ...    | ...  |
|        |      |

*FIG. 5*

| OFFSET | PATH (DUPLICATE DATA STORAGE FILE) | OFFSET (DUPLICATE DATA STORAGE FILE) | SIZE | PATH (CACHE DATA STORAGE FILE) | OFFSET (CACHE DATA STORAGE FILE) |
|---|---|---|---|---|---|
|  |  |  |  |  |  |
|  |  |  |  |  |  |
| ... | ... | ... | ... | ... | ... |
|  |  |  |  |  |  |

*FIG. 6*

| HASH VALUE | PATH | OFFSET | SIZE | REFERENCE COUNT |
|---|---|---|---|---|
|  |  |  |  |  |
|  |  |  |  |  |
| ... | ... | ... | ... | ... |
|  |  |  |  |  |

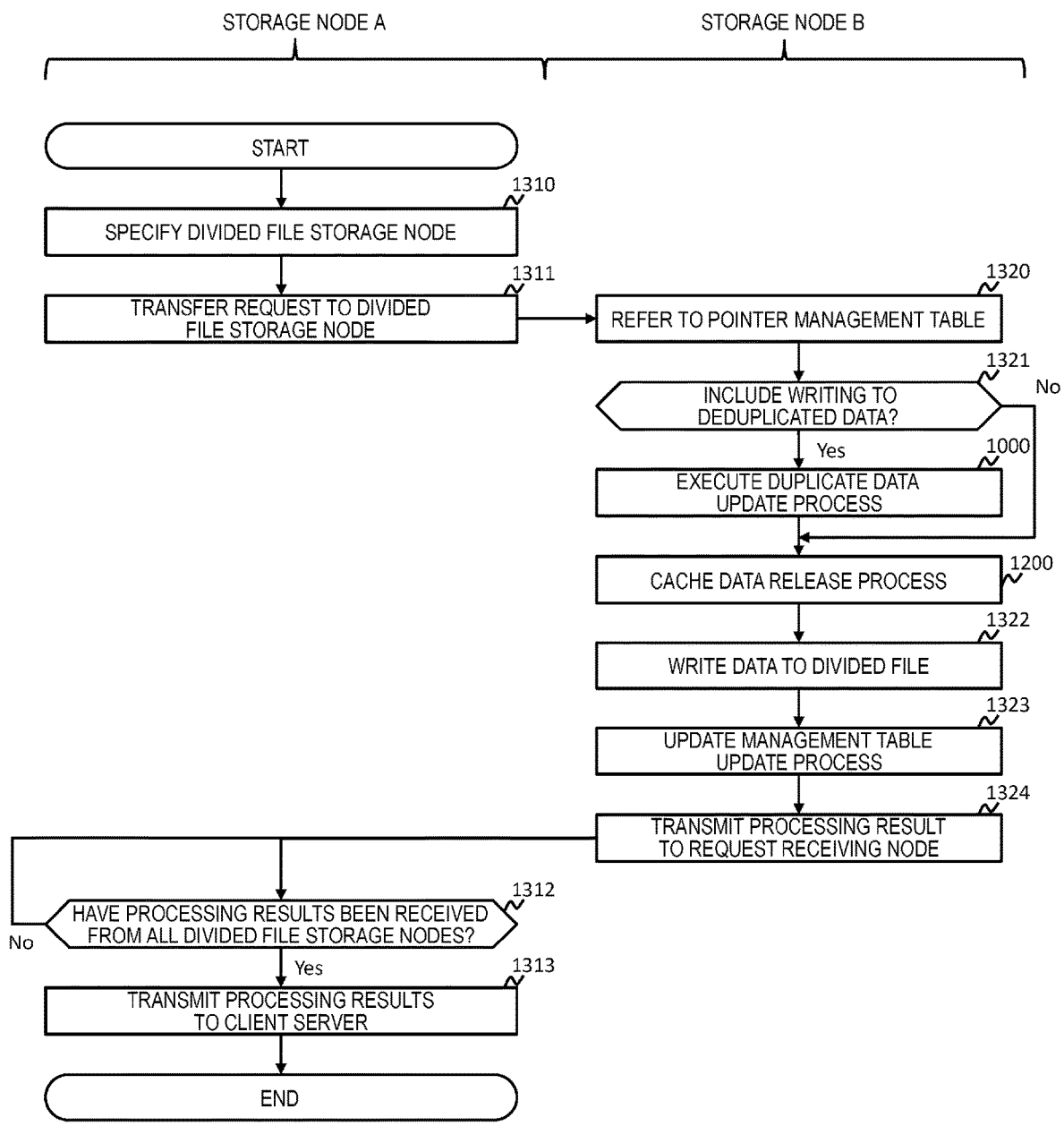

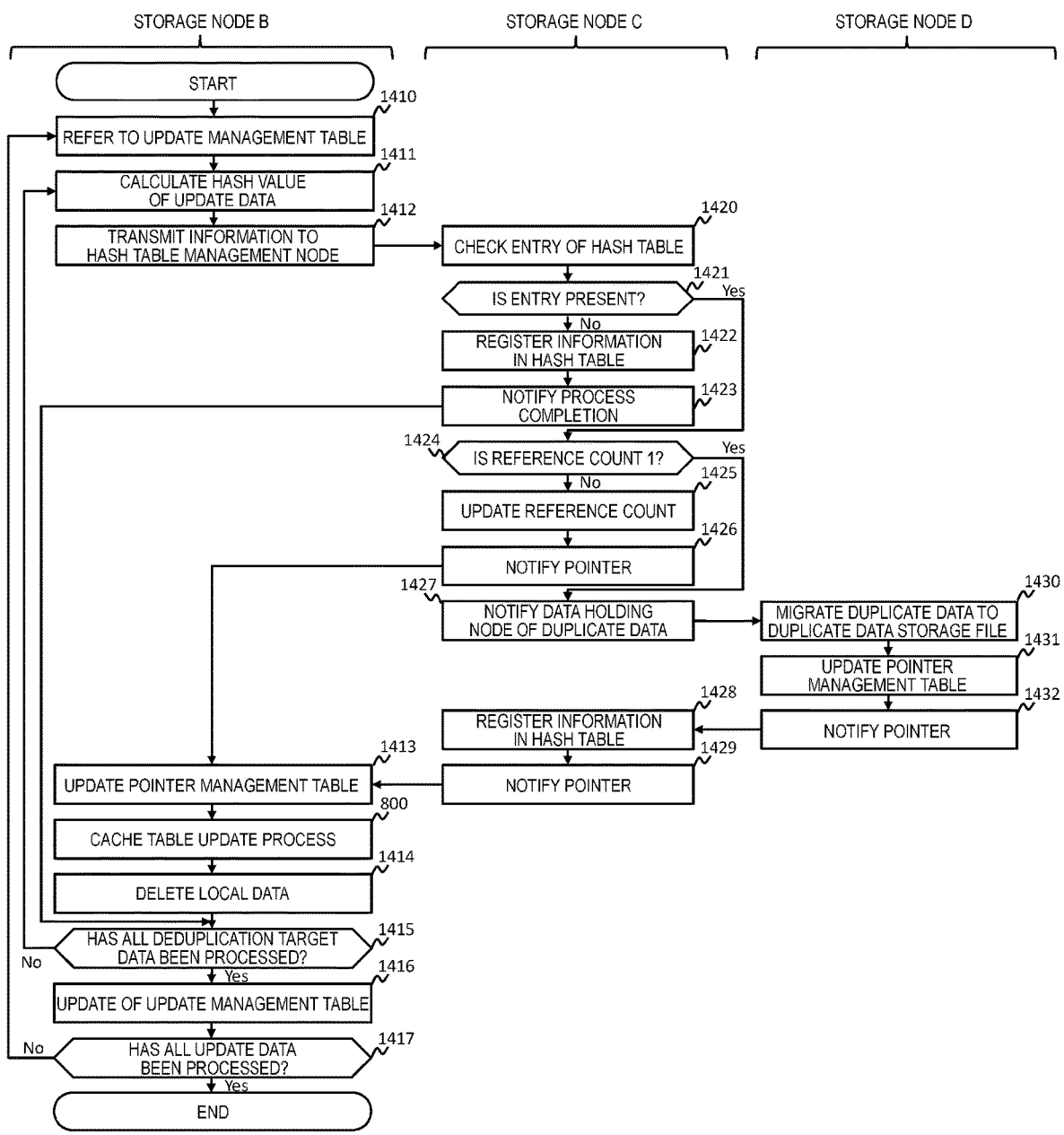

DISTRIBUTED STORAGE DEVICE AND DATA MANAGEMENT METHOD IN DISTRIBUTED STORAGE DEVICE

BACKGROUND OF THE INVENTION

1. Field of the Invention

The present invention relates to a distributed storage device and a data management method in the distributed storage device.

2. Description of Related Art

Scale-out type distributed storage is widely used to store a large amount of data used in data analysis such as artificial intelligence (AI). In order to efficiently store a large amount of data, scale-out type distributed storage requires capacity reduction technologies such as deduplication and compression.

An inter-node deduplication exists as a technology for reducing the capacity of distributed storage. The inter-node deduplication is an extension of the deduplication technology that eliminates duplicate data in single-node storage. Inter-node deduplication makes it possible to reduce not only data that is duplicated within one storage node configuring distributed storage, but also data that is duplicated between multiple storage nodes, and thus, data can be stored more efficiently.

In distributed storage, data is divided and distributed to multiple nodes that configure distributed storage to equalize access and stabilize performance.

However, if the inter-node deduplication technology is applied to the distributed storage, access will be concentrated on the nodes with duplicate data and the performance of the distributed storage will become unstable.

In order to avoid performance instability due to access concentration, it is possible to apply the technique disclosed in US Patent Application Publication No. 2014/0280664 that caches data between nodes and refers to each other.

SUMMARY OF THE INVENTION

In the method of mutually caching data between nodes as in the technique disclosed in US-A-2014/0280664, if the data does not exist in the own node, the data is received from a node that caches the same data in the vicinity and the access concentration to the nodes having actual data is avoided.

In order to improve the performance by the above method, it is necessary to restrict the number of accesses to neighboring nodes and nodes holding actual data. The purpose can be realized by increasing the cache of the own node and caching data received from other nodes as much as possible.

However, despite the limited cache capacity, the same data will be cached on multiple nodes and the cache efficiency of the distributed storage as a whole will drop. As a result, the cache miss rate increases, and as a result, access is concentrated on the node holding the actual data which the cache is missed, and performance instability cannot be avoided.

The present invention has been made in view of the above circumstances, and an object thereof is to provide a distributed storage device and a data management method in the distributed storage device that can achieve both capacity efficiency and performance stability in inter-node deduplication.

The distributed storage device according to one aspect of the present invention in order to solve the above problems is a distributed storage device including a plurality of storage nodes, in which the storage node includes a storage device and a processor, the plurality of storage nodes have a deduplication function for deduplication between storage nodes, the storage device stores files that are not deduplicated in the plurality of storage nodes, duplicate data storage files in which deduplicated duplicate data is stored, and cache data storage files in which cache data of duplicate data stored in another storage node is stored, and the processor discards the cache data when a predetermined condition is satisfied, and when a read access request for the cache data is received, reads the cache data if the cache data is stored in the cache data storage file, and requests another storage node to read the duplicate data related to the cache data if the cache data is discarded.

According to the present invention, the number of inter-node communications in inter-node deduplication can be reduced and both performance stability and high capacity efficiency can be achieved.

BRIEF DESCRIPTION OF THE DRAWINGS

FIG. 4 is a diagram showing a configuration of an update management table of the distributed storage system;

FIG. 5 is a diagram showing a configuration of a pointer management table of the distributed storage system;

FIG. 6 is a diagram showing a configuration of a hash table of the distributed storage system;

FIG. 13 is a flowchart showing a post-process deduplication write process of the distributed storage system; and FIG. 14 is a flowchart showing a post-process deduplication process of the distributed storage system.

DESCRIPTION OF EMBODIMENTS

Figure 1:
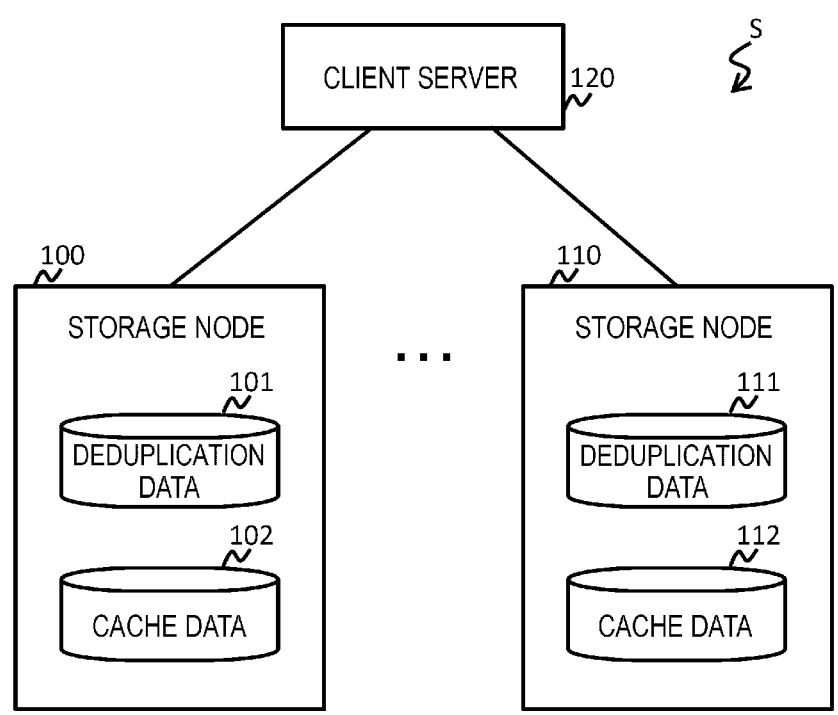
FIG. 1 is a block diagram showing a schematic configuration of a distributed storage system according to an embodiment.

Hereinafter, embodiments of the present invention will be described with reference to the drawings. It should be noted that the embodiments described below do not limit the invention according to the claims, and all of the elements and combinations thereof described in the embodiments are not essential for the means for solving the invention.

The distributed storage system (distributed storage device) of the present embodiment has, for example, the following configuration. That is, in the distributed storage system, when an in-line deduplication write process or a post-process deduplication write process is performed, the free space of each node is allocated as a cache of duplicate data. In the read process of the distributed storage system, if the cache data includes required duplicate data, the cache data is preferentially read to reduce the communication between nodes and respond to the data at high speed. When the free space is insufficient, control is performed to release the cache area while preferentially leaving the duplicate data whose own node is the data holding node in the cache.

In the following description, the "memory" is one or more memories and may typically be a main storage device. At least one memory in the memory unit may be a volatile memory or a non-volatile memory.

In the following description, the "processor" is one or more processors. At least one processor is typically a microprocessor such as a central processing unit (CPU) but may be another type of processor such as a graphics processing unit (GPU). At least one processor may be single-core or multi-core.

At least one processor may be a processor in a broad sense such as a hardware circuit (for example, field-programmable gate array (FPGA) or application specific integrated circuit (ASIC)) that performs a part or all of the processing.

In the following description, information that can obtain an output for an input may be described by an expression such as "xxx table", but the information may be data of any structure and may be a learning model such as a neural network generating the output for the input. Therefore, the "xxx table" can be referred to as "xxx information".

In the following description, the configuration of each table is an example and one table may be divided into two or more tables, or all or part of the two or more tables may be one table.

In the following description, the process may be described with "program" as the subject, but since the program is executed by the processor to perform the specified process while appropriately using a storage resource (for example, a memory) and/or a communication interface device (for example, a port), the subject of the process may be a program. The process described with the program as the subject may be a process performed by a processor or a computer equipped with the processor.

The program may be installed on a device such as a computer or may be on, for example, a program distribution server or a computer-readable (for example, non-temporary) recording medium. In the following description, two or more programs may be realized as one program or one program may be realized as two or more programs.

In the following description, a reference numeral (or a common sign among the reference numerals) is used when the same type of elements are not distinguished, and when the same type of elements are described separately, an identification number (or reference numeral) of the element may be used.

FIG. 1 is a block diagram showing a schematic configuration of a distributed storage system according to an embodiment.

In FIG. 1, the distributed storage system S includes a plurality of distributed storage nodes 100 and 110 and a client server 120.

The storage nodes 100 and 110 cooperate to form distributed storage. Although the number of storage nodes 100 and 110 shown in FIG. 1 is two, the distributed storage system S may be configured with more than two storage nodes. The number of storage nodes 100 and 110 configuring the distributed storage system S may be any number.

The storage nodes 100 and 110 includes volumes 101 and 111 for storing deduplication data, respectively. The deduplication data is data that is deduplicated from the storage nodes 100 and 110 with respect to the duplication data (deduplication target data) that is duplicated between the storage nodes 100 and 110. The deduplication data may include data that is deduplicated from one storage node 100 or 110 with respect to duplicate data that is duplicated in the one storage node 100 or 110 configuring the distributed storage system S.

The storage nodes 100 and 110 includes volumes 102 and 112 for caching duplicate data, respectively. The cache data is data in which data deleted from each storage node as duplicate data is left as a cache. The volumes 102 and 112 may include cache data other than duplicate data.

In the distributed storage system S, one of the storage nodes 100 and 110 receives an IO request (data read request or write request) from the client server 120 and communicates with each other between the storage nodes 100 and 110 via the network, and the storage nodes 100 and 110 cooperate with each other to execute IO processing. The storage nodes 100 and 110 execute deduplication processing on the duplicate data duplicated between the storage nodes 100 and 110 and store the duplicate data in the volumes 101 and 111 and the cache data in the volumes 102 and 112.

Here, for example, the storage node 100 can read from the volume 101 when the duplicate data that has received the read request from the client server 120 is stored in the own node 100. On the other hand, even when duplicate data is stored in another node (for example, when duplicate data is stored in the volume 111 of the storage node 110), if cache data is stored in the own node 100, duplicate data can be read from the volume 102. Therefore, in each of the storage nodes 100 and 110, it is possible to reduce the number of inter-node communication in order to read duplicate data if the duplicate data is held as cache data even when the duplicate data that has received the read request from the client server 120 is not stored in the own node.

Figure 2:
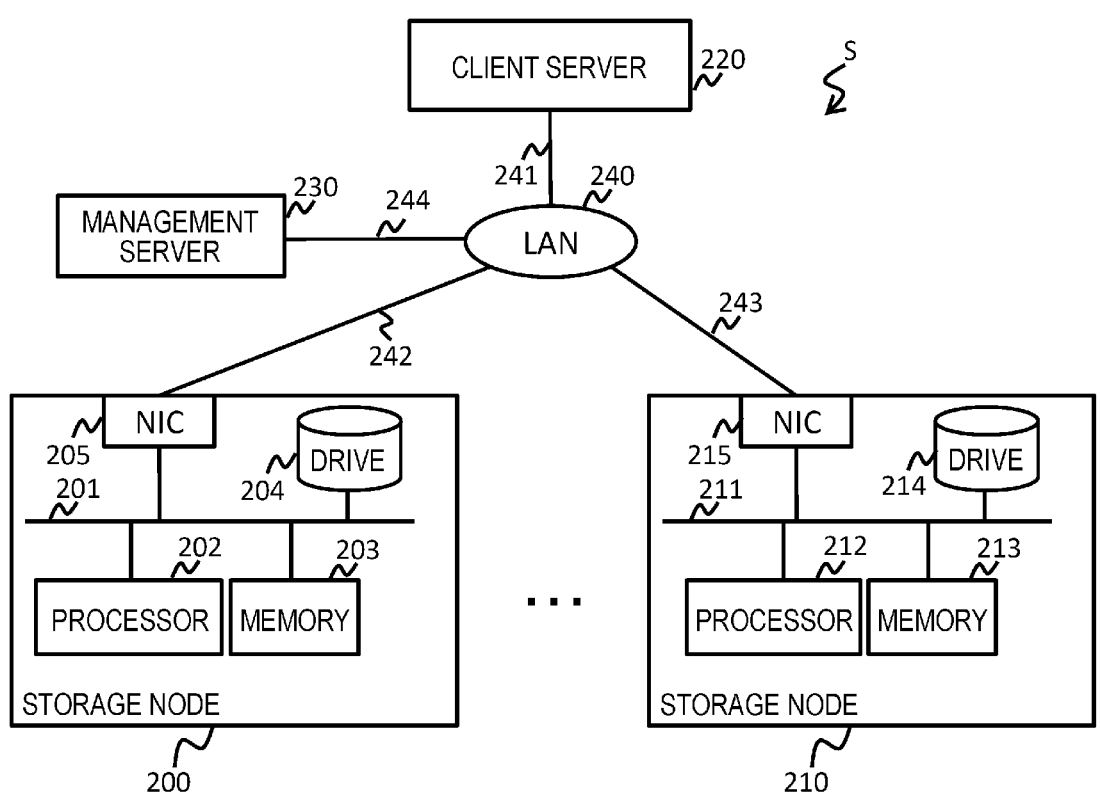
FIG. 2 is a block diagram showing a hardware configuration example of the distributed storage system.

FIG. 2 is a block diagram showing a hardware configuration example of the distributed storage system.

In FIG. 2, the distributed storage system S includes a plurality of distributed and arranged storage nodes 200 and 210 and a client server 220. The storage nodes 200 and 210 execute distributed storage programs 300 and 310 (see FIG. 3) and operate integrally to form the distributed storage system S. Although the number of storage nodes 200 and 210 shown in FIG. 2 is two, distributed storage may be configured by more than two storage nodes 200 and 210. The number of storage nodes 200 and 210 configuring the distributed storage system S may be any number.

The storage nodes 200 and 210 are connected to a local area network (LAN) 240 via lines 242 and 243, the client server 220 is connected to the LAN 240 via a line 241, and a management server 230 is connected to the LAN 240 via a line 244.

The storage node 200 includes a processor 202, a memory 203, a drive 204, and a network interface card (NIC) 205. The processor 202, the memory 203, the drive 204, and the NIC 205 are connected to each other via a bus 201.

The memory 203 is a main storage device that can be read and written by the processor 202. The memory 203 is, for example, a semiconductor memory such as SRAM or DRAM. The memory 203 can store a program being executed by the processor 202 or can provide a work area for the processor 202 to execute the program.

The drive 204 is a secondary storage device that the processor 202 can read and write. The drive 204 is, for example, a hard disk device or a solid state drive (SSD). The drive 204 can store executable files of various programs, a volume for storing data used for executing the program and duplicate data, and a volume for storing cache data.

The drive 204 may be configured of a plurality of hard disk devices or SSDs using redundant arrays of independent disks (RAID) technology or the like.

The processor 202 reads the distributed storage program 300 (see FIG. 3) stored on the drive 204 into the memory 203 and executes the distributed storage program 300. The processor 202 can connect to the NIC 205 via the bus 201 and can transmit and receive data to and from other storage nodes and the client server 220 via the LAN 240 and the lines 241 to 243.

The storage node 210 includes a processor 212, a memory 213, a drive 214, and a NIC 215. The processor 212, the memory 213, the drive 214, and the NIC 215 are connected to each other via a bus 211.

The memory 213 is a main storage device that can be read and written by the processor 212. The memory 213 is, for example, a semiconductor memory such as SRAM or DRAM. The memory 213 can store a program being executed by the processor 212 or may provide a work area for the processor 212 to execute the program.

The drive 214 is a secondary storage device that can be read and written by processor 212. The drive 214 is, for example, a hard disk device or an SSD. The drive 214 can store executable files of various programs, a volume for storing data used for executing the program and duplicate data, and a volume for storing cache data.

The drive 214 may be configured of a plurality of hard disk devices or SSDs by using RAID technology or the like.

The processor 212 reads the distributed storage program 310 (see FIG. 3) stored on the drive 214 into the memory 213 and executes the distributed storage program 310. The processor 212 can connect to the NIC 215 via the bus 211 and transmit and receive data to and from other storage nodes and the client server 220 via the LAN 240 and the lines 241 to 243.

The management server 230 connects to the storage nodes 200 and 210 configuring the distributed storage via the LAN 240 and the line 244 and manages the storage nodes 200 and 210.

Figure 3:
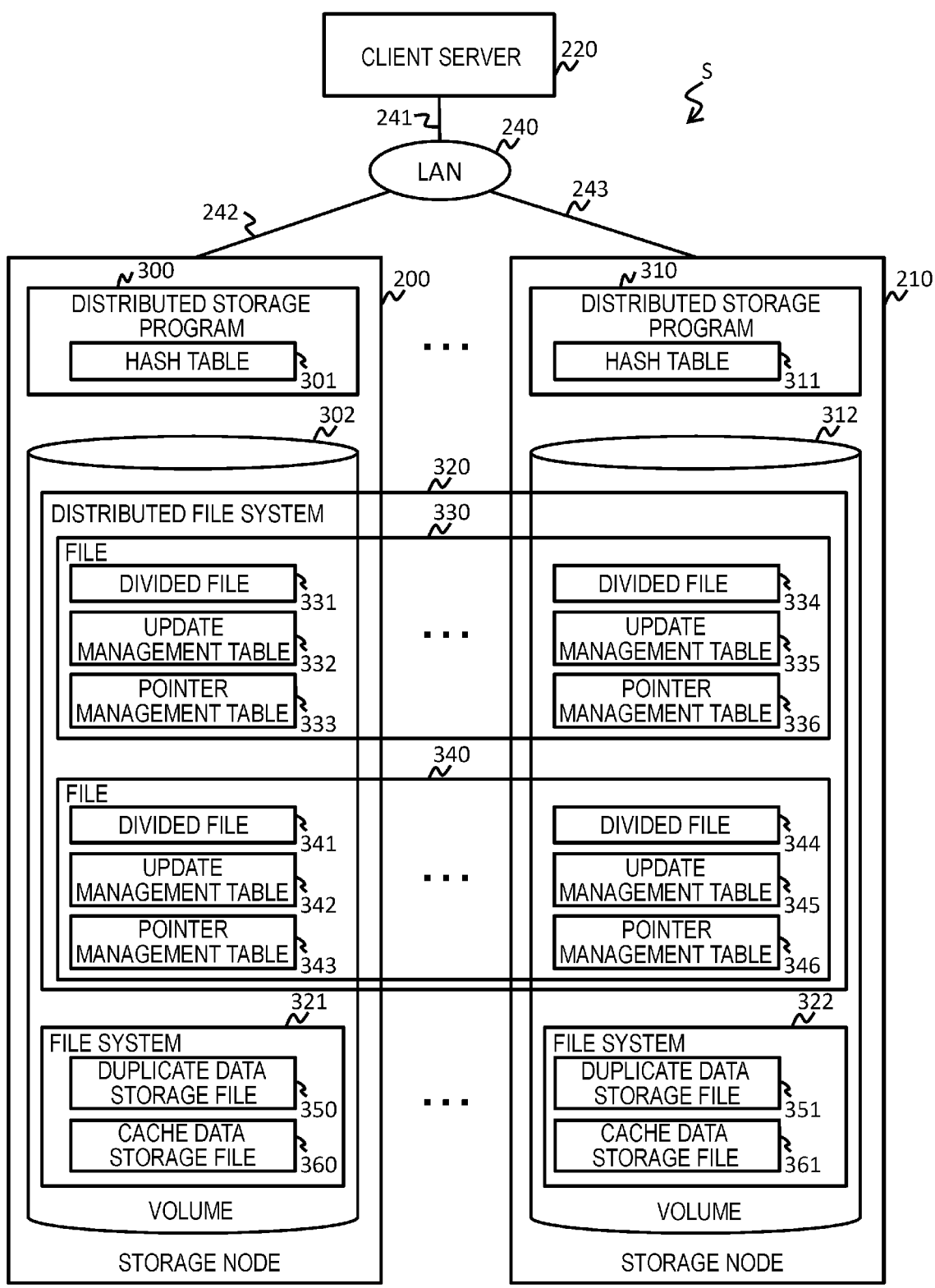
FIG. 3 is a block diagram showing a logical configuration example of the distributed storage system.

FIG. 3 is a block diagram showing a logical configuration example of the distributed storage system.

In FIG. 3, the distributed storage program 300 executed on the storage node 200, the distributed storage program 310 executed on the storage node 210, and the distributed storage program (not shown) running on the other storage nodes operate in cooperation with each other and configure the distributed storage system S.

The distributed storage system S configures a distributed file system 320 across the volumes 302 and 312 created on the drives of the storage nodes 200 and 210. The distributed storage system S manages data in units of files 330 and 340. The client server 220 can read and write data to and from each file 330 and 340 on the distributed file system. 320 via the distributed storage programs 300 and 310.

Each file 330 and 340 on the distributed file system 320 is divided into a plurality of files (divided files) and is distributed and arranged on volumes 302 and 312 included in the respective storage nodes 200 and 210.

The file 330 is divided into divided files 331 and 334 and is distributed and arranged in the volumes 302 and 312 included in the respective storage nodes 200 and 210. For example, the divided file 331 is arranged on the volume 302 included in the storage node 200, and the divided file 334 is arranged on the volume 312 included in the storage node 210. Although not shown in FIG. 3, the file 330 may be divided into more divided files.

The file 340 is divided into divided files 341 and 344, and is distributed and arranged in the volumes 302 and 312 of the respective storage nodes 200 and 210. For example, the divided file 341 is arranged on the volume 302 of the storage node 200, and the divided file 344 is arranged on the volume 312 of the storage node 210. Although not shown in FIG. 3, the file 340 may be divided into more divided files.

Which divided file is stored in the volume assigned to which storage node is determined by any algorithm. An example of the algorithm is controlled replication under scalable hashing (CRUSH). The divided files 341 and 344 are managed by the storage nodes 200 and 210 having the volumes 302 and 312 for storing the divided files 341 and 344.

Each of the files 330 and 340 on the distributed file system 320 holds an update management table and a pointer management table in addition to the divided files. The update management table manages the update status of the divided file. The pointer management table manages pointer information for duplicate data. The update management table and the pointer management table exist for each divided file.

In the example of FIG. 3, the update management table 332 and the pointer table 333 corresponding to the divided file 331 are stored in the volume 302, and the update management table 335 and the pointer table 336 corresponding to the divided file 334 are stored in the volume 312. The update management table 342 and the pointer table 343 corresponding to the divided file 341 are stored in the volume 302, and the update management table 345 and the pointer table 346 corresponding to the divided file 344 are stored in the volume 312.

The distributed storage system S configures file systems 321 and 322 on the volumes 302 and 312 of the storage nodes 200 and 210. The file systems 321 and 322 hold duplicate data storage files 350 and 351 and cache data storage files 360 and 361.

Then, the distributed storage system S excludes the duplicate data duplicated in the distributed file system 320 from the distributed file system 320, and the duplicate data excluded from the distributed file system 320 is stored as deduplication data in the duplicate data storage files 350 and 351 on the file systems 321 and 322. A plurality of duplicate data storage files 350 and 351 are created and used by the storage nodes 200 and 210, respectively. The duplicate data in the distributed file system 320 may be duplicate data between the divided files 341 and 344 or may be duplicate data in each of the divided files 341 and 344.

The distributed storage system S stores, among the duplicate data excluded from the distributed file system 320, the duplicate data which is not stored in the duplicate data storage files 350 and 351 on the file systems 321 and 322 as deduplication data in the own node, in the cache data storage files 360 and 361. The cache data storage files 360 and 361 are used by the storage nodes 200 and 210, respectively. The duplicate data in the distributed file system 320 may be duplicate data between the divided files 341 and 344, or may be duplicate data in each of the divided files 341 and 344.

In the example of FIG. 3, the duplicate data storage file 350 and the cache data storage file 360 are used for the storage node 200, and the duplicate data storage file 351 and the cache data storage file 361 are used for the storage node 210.

In the example of FIG. 3, the distributed file system 320 and the file systems 321 and 322 use the same volumes 302 and 312, but different volumes may be used.

Similarly, in the example of FIG. 3, duplicate data storage files 350 and 351 and cache data storage files 360 and 361 are stored on the same file systems 321 and 322, respectively, but may be stored on different file systems with different volumes, or on different file systems on the same volume.

In the example of FIG. 3, one duplicate data storage file and one cache data storage file exist in each storage node but a plurality of each data storage file may exist.

Each distributed storage program 300 and 310 holds hash tables 301 and 311 as a table for managing duplicate data. In the example of FIG. 3, the distributed storage program 300 holds the hash table 301 and the distributed storage program 310 holds the hash table 311. The hash values held by the storage nodes 200 and 210 can be distributed and arranged to the storage nodes 200 and 210 by dividing the hash values within the range of the hash values.

Figure 4:
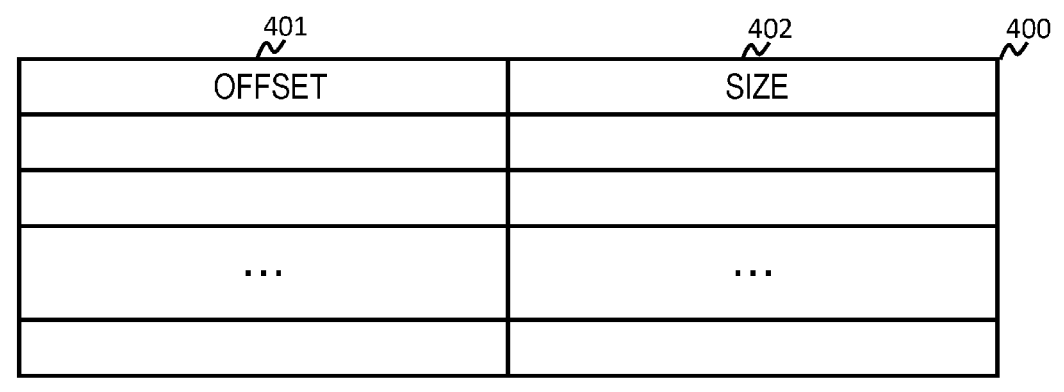

FIG. 4 is a diagram showing the configuration of the update management table of FIG. 3.

In FIG. 4, the update management table 400 is used to manage the update status of the divided file. The update management table 400 exists for each divided file and is stored as a set with the divided file in the volume for storing the divided file. When the divided file is updated, the offset value at the beginning of the update portion is recorded in the column 401 and the update size is recorded in the column 402.

FIG. 5 is a diagram showing the configuration of the pointer management table of FIG. 3.

In FIG. 5, the pointer management table 500 is used to manage pointer information for duplicate data and pointer information for cache data. The pointer information can be used as access information for accessing duplicate data or cache data.

The pointer management table 500 exists for each divided file and is stored as a set with the divided file in the volume for storing the divided file. In the column 501, the offset value at the beginning of the portion of the divided file that is duplicate data is recorded. In the column 502, the path on the system of the duplicate data storage file for storing the duplicate data is recorded. The path information may include information such as a node identifier. In the column 503, in the duplicate data storage file, the offset value at the beginning of the portion that stores the duplicate data is recorded. The size of the duplicate data is recorded in the column 504. The size of the duplicate data is also used as the size of the cache data when the cache data of the duplicate data is valid. In the column 505, the path on the file system of the cache data storage file for storing the cache data of the duplicate data is recorded. If the cache data does not exist on the node, the cache data is set to invalid. In the column 506, in the cache data storage file, the offset value at the beginning of the portion that stores the cache data of the duplicate data is recorded. If the cache data does not exist on the node, the cache data is set to invalid.

FIG. 6 is a diagram showing the structure of the hash table of FIG. 3.

In FIG. 6, the hash table 600 is used to manage the data written on the distributed storage. The hash value of the data written in the file on the distributed storage is recorded in the column 601. In the column 602, the path on the system of the file that stores the data is recorded. The path information may include information such as a node identifier. The file pointed to by the path can be a divided file or a duplicate data storage file. In the column 603, in the file for storing the data, the offset value at the beginning of the portion for storing the data is recorded. The size of the data is recorded in the column 604. The reference count of the data is recorded in the column 605. When the data is duplicate data, the reference count is 2 or more. On the other hand, if the data is not duplicate data, the reference count is 1.

The hash table 600 is stored in the memory on each storage node. The range of hash values managed by each storage node is predetermined, and the hash table of which storage node the information is recorded in is determined according to the hash value of the data to be managed.

Figure 7:
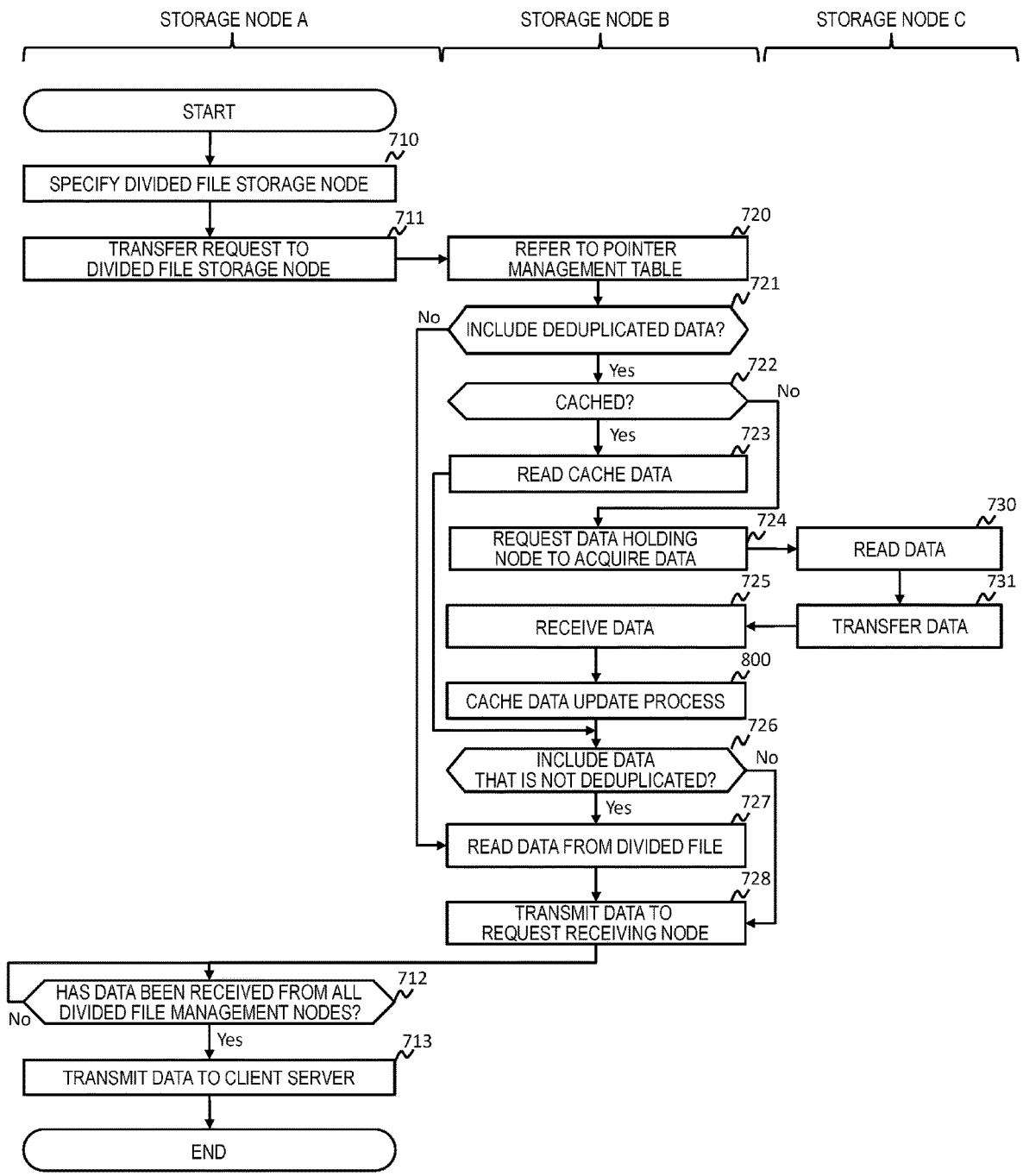
FIG. 7 is a flowchart showing a read process of the distributed storage system.

FIG. 7 is a flowchart showing a read process of the distributed storage system S. FIG. 7 shows a read process when the client server 220 reads the data of the file stored in the distributed storage system S.

In FIG. 7, a storage node A is a request receiving node that receives a request from the client server 220, a storage node B is a divided file storage node that stores a divided file corresponding to the request from the client server 220, and a storage node C is a duplicate data storage node that stores duplicate data of the divided file corresponding to the request from the client server 220.

Then, the read process is started when the client server 220 transmits a read request to the distributed storage program of any storage node A configuring the distributed storage. The distributed storage program of the storage node A that has received the read request specifies a divided file that stores the data and a divided file storage node (storage node B) that stores the divided file according to the information contained in the read request (path, offset, and size of the file that reads the data) (710). In order to specify a divided file storage node in process 710, for example, a method that relies on a file system called GlusterFS or Ceph can be mentioned.

Next, the distributed storage program of the storage node A transmits the read request to the distributed storage program of the storage node B that manages the divided file (711). When the read-requested data spans a plurality of divided files, the distributed storage program of the storage node A transmits the read request to the distributed storage programs of the plurality of storage nodes.

The distributed storage program of the storage node B to which the request has been transmitted refers to the pointer management table of the divided file (720) and checks whether the read request data contains the deduplicated duplicate data (721).

If the read request data does not contain duplicate data, the distributed storage program in the storage node B reads the requested data from the divided file (727) and transmits the read data to the storage node A that has received the read request (728).

On the other hand, when the read request data contains duplicate data, the distributed storage program of the storage node B refers to the pointer management table and determines whether the columns 505 and 506 are valid, that is, whether the cache data is stored in the cache data storage file (722). If the columns 505 and 506 are valid, duplicate data is read from the cache data storage file using the information in the columns 504 to 506 (723).

However, if columns 505 and 506 are invalid, the distributed storage program of the storage node B transmits a request to the distributed storage program of the storage node C to read duplicate data using the information in the columns 502 to 504 (724). The distributed storage program of the storage node C which has received the request reads the specified data from the duplicate data storage file of the own node (730) and transmits the data to the distributed storage program of the storage node B (731). After receiving the data (725), the distributed storage program of the storage node B executes the cache data update process (800) based on the received data.

Next, the distributed storage program of the storage node B checks whether the read request includes normal data that is not deduplicated (726). If the read request does not include normal data that is not deduplicated, the distributed storage program of the storage node B transmits the read data to the storage node A which has received the read request (728).

On the other hand, when the read request includes normal data that is not deduplicated, the distributed storage program of the storage node B reads the data from the divided file (727) and transmits the data together with the data read in processes 722 to 725 to the storage node A that has received the read request (728).

Next, the distributed storage program of the storage node A that has received the data checks whether the data has been received from all the nodes that have transferred the request (712). If the distributed storage program of the storage node A has received the data from all the storage nodes, the distributed storage program transmits the data to the client server 220 and ends the process. If data has not been received from all the storage nodes, the process returns to process 712 and the check process is repeated.

Figure 8:
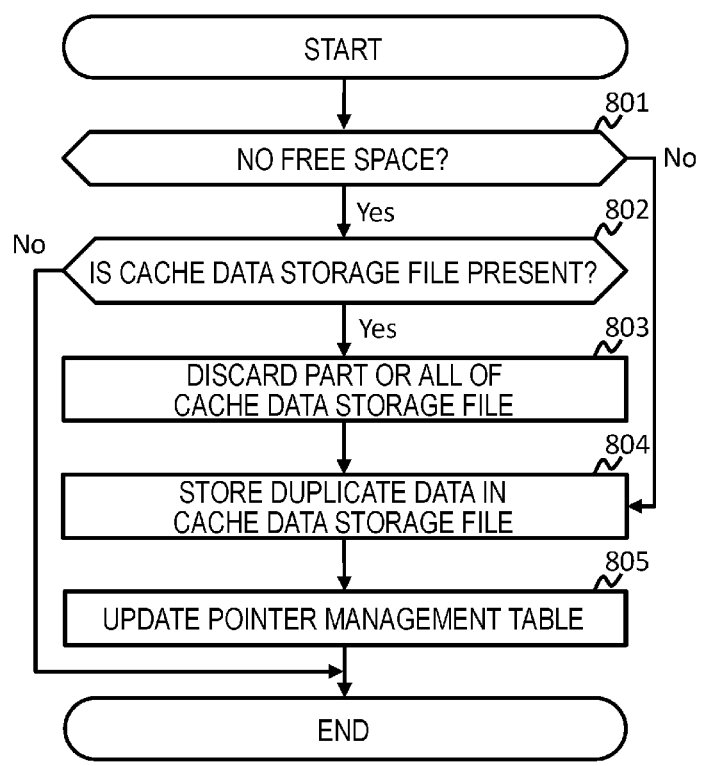
FIG. 8 is a flowchart showing a cache data update process of the distributed storage system.

FIG. 8 is a flowchart showing the cache data update process (800) of FIG. 7. FIG. 8 shows a process when storing duplicate data that is not stored in the cache data storage file of the own node in the cache data storage file.

The distributed storage program checks whether the free space of the own node is exhausted (801). Instead of checking exhaustion, it may be checked whether a predetermined amount of free space exists. If not exhausted, duplicate data is added to the cache data storage file and stored (804), and the columns 505 and 506 of the pointer management table corresponding to the stored cache data are updated (805). Here, if the cache data storage file does not exist, a cache data storage file can be newly created.

On the other hand, when the free space of the own node is exhausted, the distributed storage program checks whether the cache data storage file exists (802). If the cache data storage file does not exist, the cache data is not stored in the cache data storage file and the process ends. However, if the cache data storage file exists, a part or all of the cache data storage file is discarded (803), duplicate data is stored in the released area (804), and the columns 505 and 506 of the pointer management table corresponding to the discarded cache data and stored cache data are updated (805).

When a part or all of the cache data storage file is discarded (803), duplicate data included in the divided data in which the own node is a data holding node is preferentially left in the cache data storage file by an algorithm for determining the storage node of the divided file, such as CRUSH. When releasing the cache data, the cache data determined to be discarded, and cache data cached for the same file may be collectively discarded. The divided file storage node determination algorithm can be selected according to the distributed file system. A cache replacement algorithm such as a general least recently used (LRU) may also be used in combination.

In the write process described below, the distributed storage system S supports both in-line deduplication, which executes deduplication when writing data, and post-process deduplication, which executes deduplication at any timing.

Figure 9:
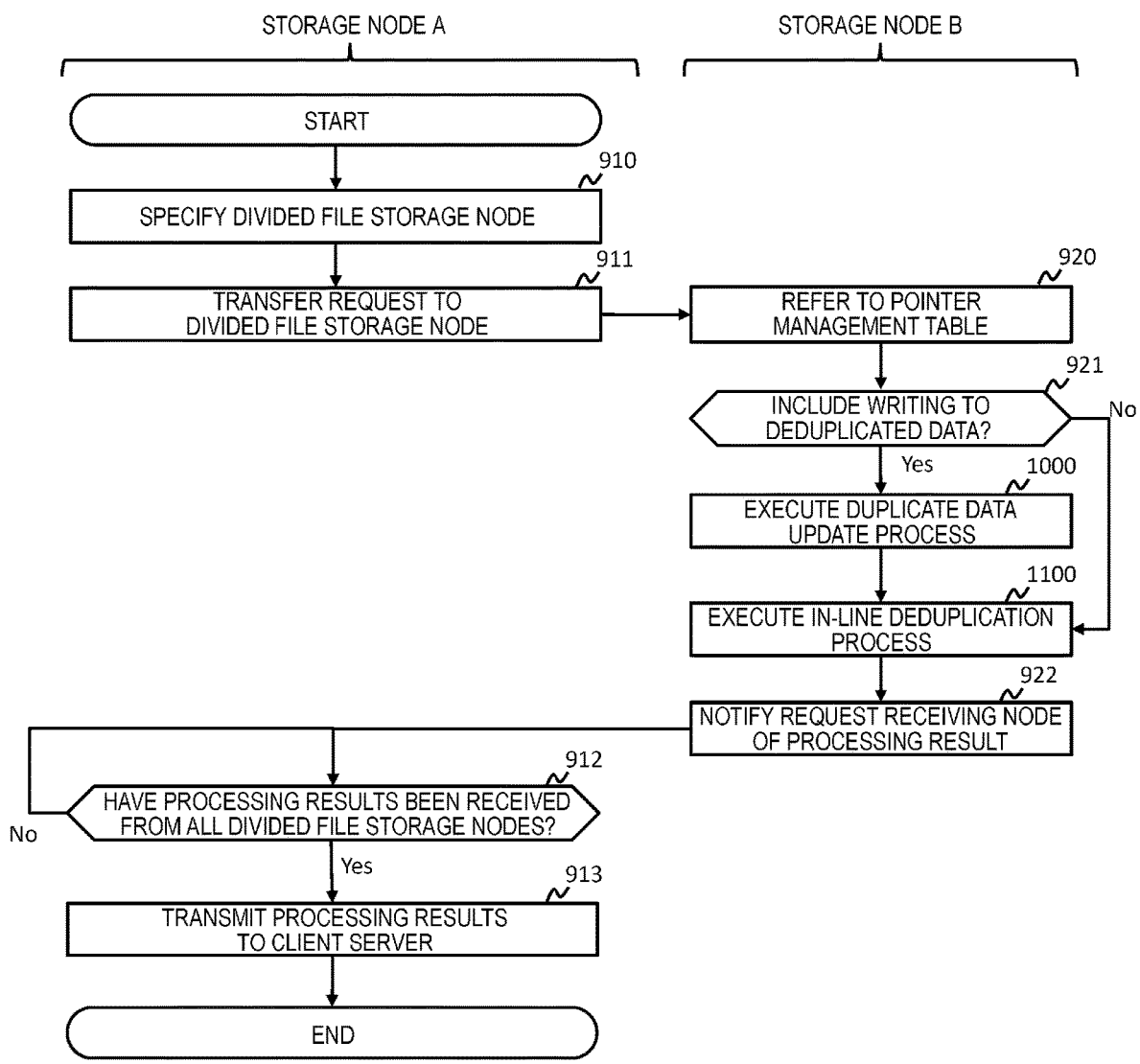
FIG. 9 is a flowchart showing an in-line deduplication write process of the distributed storage system.

FIG. 9 is a flowchart showing an in-line deduplication write process of the distributed storage system S. FIG. 9 shows a write process when the client server 220 writes data to a file stored on the distributed storage system S at the time of in-line deduplication.

In FIG. 9, the storage node A is a request receiving node that receives a request from the client server 220, and the storage node B is a divided file storage node that stores a divided file corresponding to the request from the client server 220.

Then, when the client server 220 transmits a write request to the distributed storage program of any storage node A configuring the distributed storage system S, the write process is started. The distributed storage program of the storage node A that has received the write request specifies a divided filed storage node (storage node B) that stores the divided file to be written and the divided file according to the information (path, offset, and size of the file to write the data) included in the write request (910). In order to specify a divided file storage node in process 910, as in process 710, for example, a method that relies on a file system called GlusterFS or Ceph can be mentioned.

Next, the distributed storage program of the storage node A transfers the write request to the distributed storage program of the storage node B that manages the divided file (911). When the write-requested data spans a plurality of divided files, the distributed storage program of the storage node A transfers the write request to the distributed storage programs of the plurality of storage nodes.

The distributed storage program of the storage node B to which the request has been transferred refers to the pointer management table of the divided file (920) and checks whether the write request data contains the deduplicated duplicate data (921).

If the write request data contains duplicate data, the distributed storage program of the storage node B executes the duplicate data update process (1000) and then executes the in-line deduplication process (1100).

On the other hand, if the write request data does not include duplicate data, the distributed storage program of the storage node B executes the in-line deduplication process (1100).

Next, the distributed storage program of the storage node B notifies the distributed storage program of the storage node A that has received the write request of the processing result after the in-line deduplication process (922).

Next, the distributed storage program of the storage node A that has received the processing result from the storage node B checks whether the processing results have been received from all the storage nodes that have transferred the request (912). If the processing results have been received from all the storage nodes, the distributed storage program of the storage node A transmits the write processing results to the client server 220 (913) and ends the process. If the processing results have not been received from all the storage nodes, the process returns to process 912 and the check process is repeated.

Figure 10:
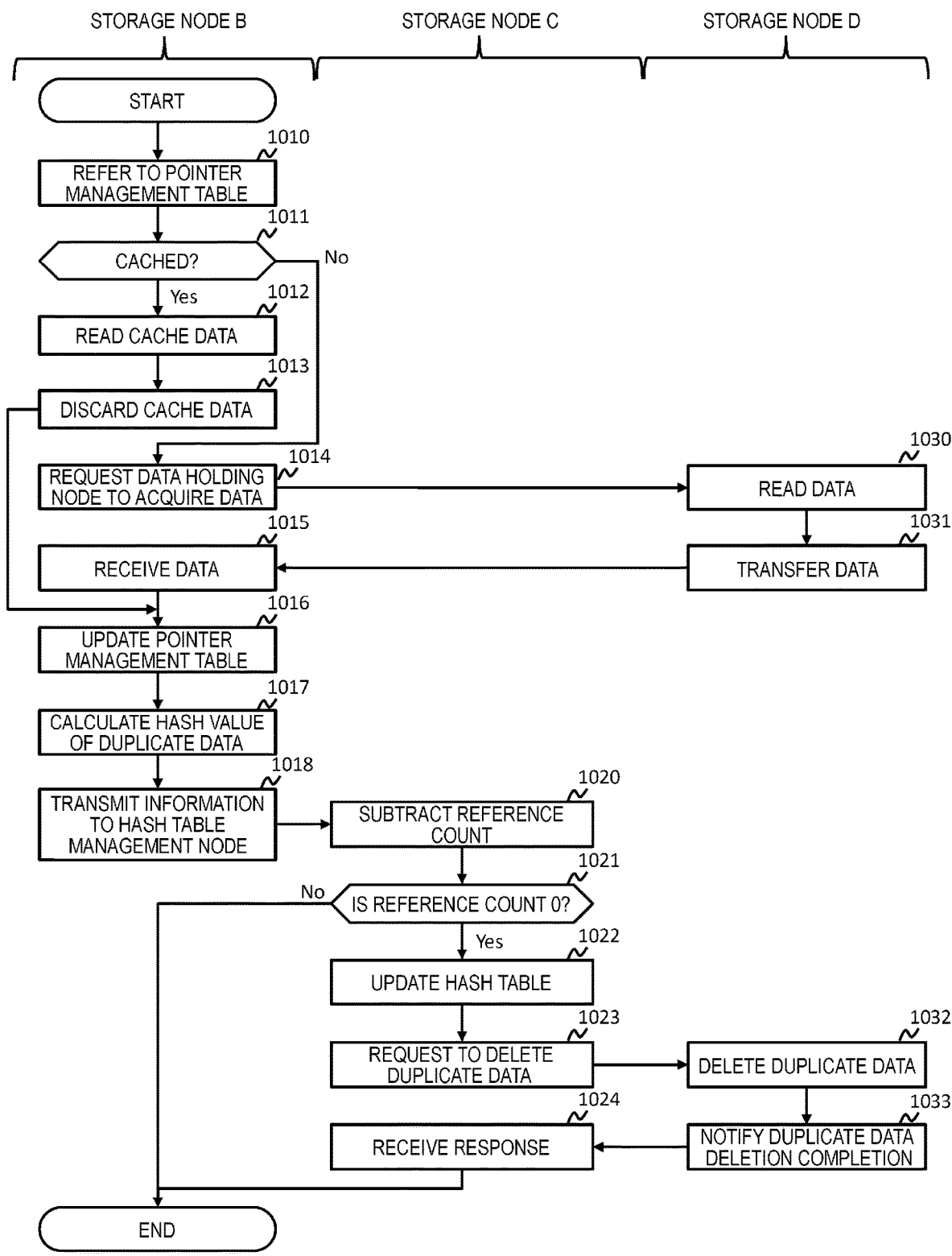
FIG. 10 is a flowchart showing a duplicate data update process of the distributed storage system.

FIG. 10 is a flowchart showing the duplicate data update process (1000) of FIG. 9.

In FIG. 10, the storage node B is a divided file storage node that stores the divided file corresponding to the request from the client server 220, the storage node C is a hash table management node that manages the hash value of the duplicate data corresponding to the request from the client server 220, and the storage node D is a duplicate data storage node that stores duplicate data of the divided file corresponding to the request from the client server 220.

First, the distributed storage program of the storage node B that executes the duplicate data update process of FIG. 9 refers to the pointer management table of the divided file for writing the data (1010).

Next, the distributed storage program of the storage node B refers to the pointer management table and determines whether the columns 505 and 506 are valid, that is, whether the cache data is stored in the cache data storage file (1011). If the columns 505 and 506 are valid, duplicate data is read from the cache data storage file using the information in the columns 504 to 506 (1012), and then the duplicate data stored in the cache data storage file is discarded (1013).

On the other hand, if columns 505 and 506 are invalid, the distributed storage program of the storage node B transmits a request to the distributed storage program of the storage node D to read duplicate data using the information of the columns 502 to 504 (1014). The distributed storage program of the storage node D that has received the request reads the specified data from the duplicate data storage file of the own node (1030) and transmits the data to the distributed storage program of the storage node B (1031), and the distributed storage program of the storage node B receives the data (1015).

Next, the distributed storage program of the storage node B deletes the corresponding duplicate data entry from the pointer management table (1016). If the duplicate data entry contains reference information of the valid cache data storage file (columns 505 and 506), the reference information of the valid cache data storage file is also deleted.

Next, the distributed storage program of the storage node B calculates the hash value of the duplicate data read in processes 1011 to 1015 (1017) and transmits the duplicate data information to the storage node C having a hash table that manages the duplicate data (1018).

Next, the distributed storage program of the storage node C that has received the duplicate data information searches for the entry of the data recorded in the own hash table and subtracts the reference count of the data (1020).

If the reference count of the data is not 0, the distributed storage program of the storage node C ends the process as it is.

On the other hand, if the reference count becomes 0, the distributed storage program of the storage node C deletes the entry of the data from the hash table (1022) and transmits a deletion request of the duplicate data to the storage node D (1023). The distributed storage program of the storage node D that has received the deletion request deletes the designated duplicate data (1032) and notifies the completion of the deletion of the duplicate data (1033). The distributed storage program of the storage node C ends the process after receiving the completion notification (1024).

Figure 11:
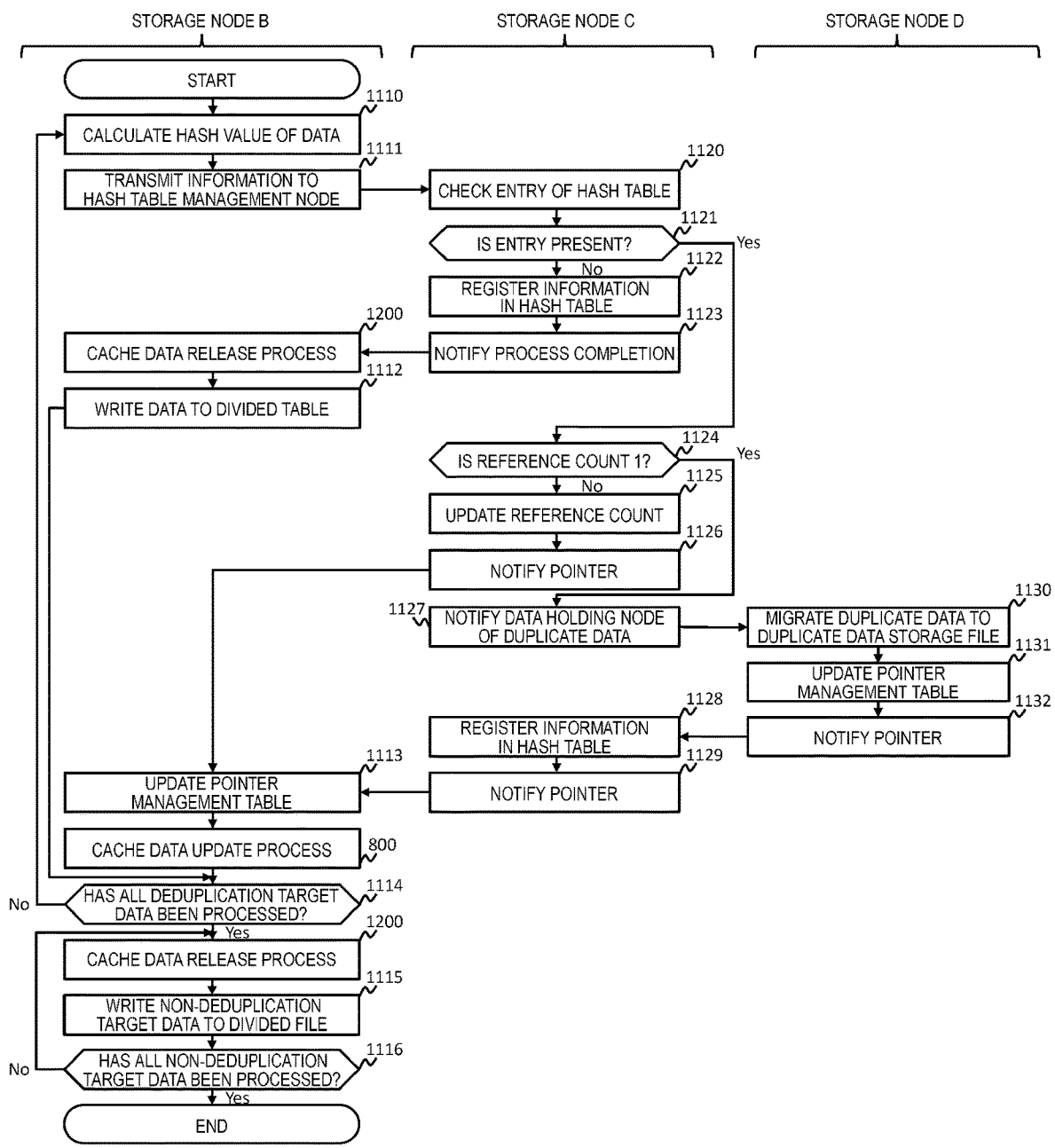
FIG. 11 is a flowchart showing an in-line deduplication process of the distributed storage system.

FIG. 11 is a flowchart showing the in-line deduplication process (1100) of FIG. 9.

In FIG. 11, the storage node B is a divided file storage node that stores the divided file corresponding to the request from the client server 220, the storage node C is a hash table management node that manages the hash value of the duplicate data corresponding to the request from the client server 220, and the storage node D is a duplicate data storage node that holds data that is duplicated with the deduplication target data.

The distributed storage program of the storage node B that executes the in-line deduplication process calculates the hash value of the data to be written in the write process (1110). Here, the distributed storage program of the storage node B calculates a hash value for each data to be deduplicated. For example, if the data to be written is 1000 bytes and the data to be deduplicated is 100 bytes from the 20th byte from the beginning of the data to be written and 400 bytes from the 540th byte from the beginning, process 1110 is executed twice.

Next, the distributed storage program of the storage node B transmits the deduplication target data information (the hash value, the path, offset, and size of the divided file that stores the deduplication target data) to the storage node C having a hash table that manages the deduplication target data based on the calculated hash value (1111).

The distributed storage program of the storage node C that has received the information searches the hash table (1120) and checks whether the entry of the deduplication target data exists in the hash table (1121).

If no entry exists in the hash table, the distributed storage program of the storage node C registers the information of the deduplication target data (the hash value, the path, offset, and size of the divided file that stores the deduplication target data) in the hash table and sets the reference count to 1 (1122).

Next, the distributed storage program of the storage node C notifies the storage node B that executes the in-line deduplication process of the end of the process (1123).

The distributed storage program of the storage node B that has received the notification of the end of the process performs the cache data release process (1200) and then writes the data to be deduplicated to the divided file (1112).

Next, the distributed storage program of the storage node B checks whether the processes of all deduplication target data have been completed (1114), and if the processes of all deduplication target data have not been completed, the processes from process 1110 are repeated. If the processes of all deduplication target data have been completed, the cache data release process (1200) is performed, and then the non-deduplication target data is also written to the divided file (1115). Next, it is checked whether the processes of all the non-deduplication target data have been completed (1116). If completed, the in-line deduplication process is ended, and if not, the processes from processes 1200 and 1115 are repeated.

On the other hand, in process 1121, if an entry exists in the hash table, the distributed storage program of the storage node C checks whether the reference count of the entry is 1 (1124), and if not 1 (if the reference count is 2 or more), considers as duplicate data and increments the reference count of the entry by 1 (1125).

Next, the distributed storage program of the storage node C notifies the storage node B that executes the in-line deduplication process of the information recorded in the entry (path, offset, and size of the duplicate data storage file that stores duplicate data) as pointer information (1126).

Next, the distributed storage program of the storage node B that has received the pointer information writes the received pointer information to the pointer management table of the divided file that was supposed to store the deduplication target data (1113). The distributed storage program of the storage node B executes the cache data update process (800) in order to store the duplicate data in the cache data storage file of the own node.

Then, the distributed storage program of the storage node B checks whether the processes of all deduplication target data have been completed (1114), and if the processes of all deduplication target data have not been completed, the processes from process 1110 are repeated. If the processes of all deduplication target data have been completed, the cache data release process (1200) is performed, and then the non-deduplication target data is also written to the divided file (1115). Next, it is checked whether the processes of all the non-deduplication target data have been completed (1116), and if completed, the in-line deduplication process is ended, and if not, the processes from processes 1200 and 1115 are repeated.

On the other hand, in process 1124, when the reference count is 1, the distributed storage program of the storage node C notifies the storage node D that holds the data that is duplicated with the deduplication target data of the information recorded in the entry (path, offset, and size of the divided file that stores duplicate data) based on the information of the hash table entry (1127).

The distributed storage program of the storage node D that has received the notification migrates the duplicate data stored in its own volume from the divided file to the duplicate data storage file (1130). Here, the distributed storage program of the storage node D may perform a byte comparison to see if the deduplication target data and the duplicate data really overlap. The distributed storage program of the storage node D updates the pointer management table according to the data migration (1131) and notifies the pointer information (path, offset, and size of the duplicate data storage file that stores the duplicate data) to the distributed storage program of the storage node C (1132).

The distributed storage program of the storage node C that has received the pointer information overwrites the path, offset, and size of the duplicate data entry in the hash table to correspond to the path, offset, and size of the duplicate data stored in the duplicate data storage file (1128).

Next, the distributed storage program of the storage node C notifies the storage node B that executes the in-line deduplication process of the pointer information of the duplicate data (path, offset, and size of the duplicate data storage file that stores the duplicate data) (1129).

Next, the distributed storage program of the storage node B that has received the pointer information writes the received pointer information to the pointer management table of the divided file that was supposed to store the deduplication target data (1113). The distributed storage program of the storage node B executes the cache data update process (800) in order to store the duplicate data in the cache data storage file of the own node.

Then, the distributed storage program of the storage node B checks whether the processing of all deduplication target data has been completed (1114), and if the processing of all deduplication target data has not been completed, the processes from process 1110 are repeated. If the processing of all deduplication target data has been completed, the cache data release process (1200) is performed, and then the non-deduplication target data is also written to the divided file (1115). Next, it is checked whether the processing of all the non-deduplication target data has been completed (1116), and if completed, the in-line deduplication process is ended, and if not, the processes from processes 1200 and 1115 are repeated.

Figure 12:
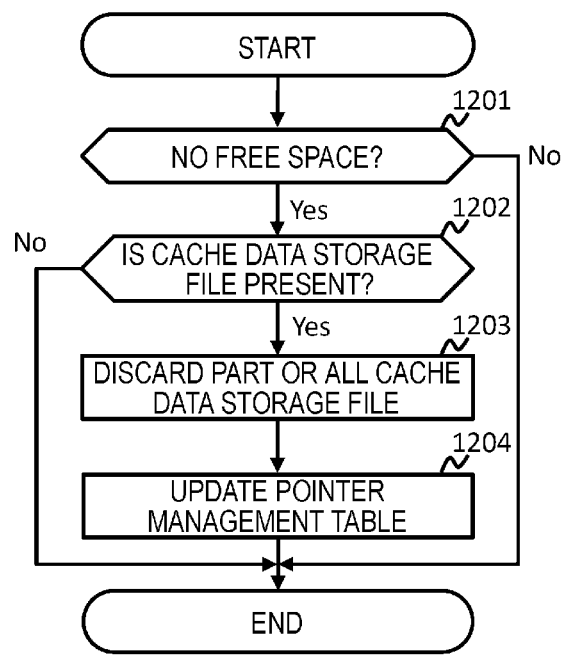
FIG. 12 is a flowchart showing a cache data release process of the distributed storage system.

FIG. 12 is a flowchart showing the cache data release process (1200) of FIG. 11. FIG. 12 shows a process for checking the free space of the volume of the own node, and if the free space is exhausted, discarding the cache data to secure the free space.

The distributed storage program checks whether the free space of the own node is exhausted (1201), and if not exhausted, ends the processing without discarding the cache data.

On the other hand, if the free space of the own node is exhausted, the distributed storage program checks whether the cache data storage file exists (1202). If the cache data storage file does not exist, the process ends without discarding the cache data. However, if the cache data storage file exists, a part or all of the cache data storage file is discarded to release the area (1203), and the columns 505 and 506 of the pointer management table corresponding to the stored cache data are disabled (1204).

When a part or all of the cache data storage file is discarded and the area is released (1203), the duplicate data included in the divided data whose own node is the data holding node is preferentially left in the cache data storage file by the storage node determination algorithm of the divided file such as CRUSH. When releasing the cache data, the cache data determined to be discarded, and the cache data cached for the same file may be collectively discarded. The divided file storage node determination algorithm can be selected according to the distributed file system. A cache replacement algorithm such as a general least recently used (LRU) may also be used in combination.

FIG. 13 is a flowchart showing a post-process deduplication write process of the distributed storage system S. FIG. 13 shows a write process when the client server 220 writes data to a file stored on the distributed storage system S at the time of post-process deduplication.

In FIG. 13, the write process is started when the client server 220 transmits a write request to the distributed storage program of any storage node A configuring the distributed storage system S. The distributed storage program of the storage node A that has received the write request specifies a divided file storage node (storage node B) that stores the divided file to be executed for the write process and the divided file according to the information (path, offset, and size of the file to write the data) included in the write request (1310). In order to specify a divided file storage node in process 1310, as in processes 710 and 910, for example, a method that relies on a file system called GlusterFS or Ceph can be mentioned.

Next, the distributed storage program of the storage node A transfers the write request to the distributed storage program of the storage node B that manages the divided file (1311). When the write-requested data spans a plurality of divided files, the distributed storage program of the storage node A transfers the write request to the distributed storage programs of the plurality of storage nodes.

The distributed storage program of the storage node B to which the request has been transferred refers to the pointer management table of the divided file (1320) and checks whether the write request data includes the deduplicated duplicate data (1321).

When the write request data contains duplicate data, the distributed storage program of the storage node B executes the duplicate data update process 1000 and the cache data release process 1200, and then writes the data to the divided file (1322).

On the other hand, in process 1321, when the write request data does not include the duplicate data, the distributed storage program of the storage node B executes the cache data release process 1200 and then writes the data to the divided file (1322).

Next, the distributed storage program of the storage node B records the start offset and size of the portion where the data is written in the update management table of the divided file (1323).

Next, the distributed storage program of the storage node B notifies the distributed storage program of the storage node A that has received the write request of the processing result (1324).

Next, the distributed storage program of the storage node A that has received the processing result from the storage node B checks whether the processing results have been received from all the storage nodes that have transferred the request (1312). If the distributed storage program of the storage node A has received the processing results from all the storage nodes, the distributed storage program transmits the write process results to the client server 220 and ends the processing. If the processing results have not been received from all the storage nodes, the process returns to process 1312 and the check process is repeated.

FIG. 14 is a flowchart showing the post-process deduplication process of the distributed storage system S.

In FIG. 14, the storage node B is a divided file storage node that stores the divided file corresponding to the request from the client server 220, the storage node C is a hash table management node that manages the hash value of the duplicate data corresponding to the request from the client server 220, and the storage node D is a duplicate data storage node that holds data that is duplicated with the deduplication target data.

In FIG. 14, the distributed storage program of the storage node B that executes the post-process deduplication process refers to the update management table of the divided file managed by itself (1410).

Next, the distributed storage program of the storage node B reads the updated data among the data stored in the divided file and calculates the hash value (1411). Here, the distributed storage program of the storage node B calculates a hash value for each data to be deduplicated. For example, if the read update data is 1000 bytes and the data to be deduplicated is 100 bytes from the 20th byte from the beginning of the data to be written and 400 bytes from the 540th byte from the beginning, process 1211 is executed twice.

Next, the distributed storage program of the storage node B transmits the deduplication target data information (the hash value, the path, offset, and size of the divided file that stores the deduplication target data) to the storage node C having a hash table that manages the deduplication target data based on the calculated hash value (1412).

The distributed storage program of the storage node C that has received the information searches the hash table (1420) and checks whether the entry of the deduplication target data exists in the hash table (1421).

If no entry exists in the hash table, the distributed storage program of the storage node C registers the information of the deduplication target data (the hash value, the path, offset, and size of the divided file that stores the deduplication target data) in the hash table and sets the reference count to 1 (1422).

Next, the distributed storage program of the storage node C notifies the storage node B that executes the post-process deduplication process of the end of the process (1423).

The distributed storage program of the storage node B that has received the notification of the end of the process checks whether the processing of all deduplication target data has been completed (1415), and if the processing of all deduplication target data has been completed, deletes the entry of the updated data processed from the update management table (1416), and checks whether all the updated data have been processed (1417).

The distributed storage program of the storage node B ends the post-process deduplication process if all the update data is processed, and repeats the processes from process 1410 otherwise.

On the other hand, the distributed storage program of the storage node B repeatedly executes the processes after process 1411 if the processing of all deduplication target data has not been completed in process 1415.

On the other hand, in process 1421, if an entry exists in the hash table, the distributed storage program of the storage node C checks whether the reference count of the entry is 1 (1424), and if not 1 (if the reference count is 2 or more), considers as duplicate data, and increments the reference count of the entry by 1 (1425).

Next, the distributed storage program of the storage node C notifies the storage node B that executes the post-process deduplication process of the information recorded in the entry (path, offset, and size of the duplicate data storage file that stores duplicate data) as pointer information (1426).

Next, the distributed storage program of the storage node B that has received the pointer information writes the received pointer information to the pointer management table of the divided file that was supposed to store the deduplication target data (1413). The distributed storage program of the storage node B executes the cache data update process (800) and then deletes the local duplicate data stored in the divided file (1414).

Next, the distributed storage program of the storage node B checks whether the processing of all deduplication target data has been completed (1415), and if the processing of all deduplication target data has been completed, deletes the processed update data entry from the update management table (1416), and checks whether all update data has been processed (1417).

The distributed storage program of the storage node B ends the post-process deduplication process if all the update data has been processed, and repeats the processes from process 1410 otherwise.

On the other hand, the distributed storage program of the storage node B repeatedly executes the processes after process 1411 if the processing of all deduplication target data has not been completed in process 1415.

On the other hand, in process 1124, when the reference count is 1, the distributed storage program of the storage node C notifies the information (the path, offset, and size of the divided file that stores duplicate data) recorded in the entry to the storage node D that holds data that is duplicated with the deduplication target data based on the information of the hash table entry (1427).

The distributed storage program of the storage node D that has received the notification migrates the duplicate data stored in its own volume from the divided file to the duplicate data storage file (1430). Here, the distributed storage program of the storage node D may perform a byte comparison to see if the deduplication target data and the duplicate data really overlap. The distributed storage program of the storage node D updates the pointer management table according to the data migration (1431) and notifies the distributed storage program of the storage node C of the pointer information (the path, offset, and size of the duplicate data storage file that stores duplicate data) (1432).

The distributed storage program of the storage node C that has received the pointer information overwrites the path, offset, and size of the duplicate data entry in the hash table to correspond to the path, offset, and size of the duplicate data stored in the duplicate data storage file (1428).

Next, the distributed storage program of the storage node C notifies the storage node B that executes the post-process deduplication process of the pointer information of the duplicate data (the path, offset, and size of the duplicate data storage file that stores the duplicate data) (1429).

Next, the distributed storage program of the storage node B that has received the pointer information writes the received pointer information to the pointer management table of the divided file that was supposed to store the deduplication target data (1413). The distributed storage program of the storage node B executes the cache data update process (800) in order to store the duplicate data in the cache data storage file of the own node and then deletes the local duplicate data stored in the divided file (1414).

Next, the distributed storage program of the storage node B checks whether the processing of all deduplication target data has been completed (1415), and if the processing of all deduplication target data has been completed, deletes the update data entry processed from the update management table (1416), and checks whether all updated data has been processed (1417).

The distributed storage program of the storage node B ends the post-process deduplication process if all the update data has been processed, and repeats the processes from process 1410 otherwise.

On the other hand, the distributed storage program of the storage node B repeatedly executes the processes after process 1411 if the processing of all deduplication target data has not been completed in process 1415.

According to such an embodiment, it is possible to realize a distributed storage system S and a data management method in the distributed storage system that can achieve both capacity efficiency and performance stability in inter-node deduplication.

More specifically, according to the above operation flow, in the in-line deduplication write process or the post-process deduplication write process, free space is allocated as a cache of duplicate data, and when the capacity is exhausted, the cache area is released, thereby making it possible to stably supply high performance using cache data at the time of the read process while realizing high-capacity and efficient distributed storage using inter-node deduplication.

By adding up the divided file size of all storage nodes, the duplicate data storage file, and the capacity of the cache data storage file, the capacity before applying inter-node deduplication can be calculated and provided to the storage administrator and the like.

By adding drives or the like to each storage node and adding volume capacity, the capacity that can be used for the cache data storage file can be increased and the performance can be improved.

Note that the above-described embodiment describes the configuration in detail in order to explain the present invention in an easy-to-understand manner, and is not necessarily limited to the one including all the described configurations. It is possible to add, delete, or replace a part of the configuration of each embodiment with other configurations.

Each of the above configurations, functions, processing units, processing means, and the like may be realized by hardware by designing apart or all of them by, for example, an integrated circuit. The present invention can also be realized by a program code of software that realizes the functions of the examples. Here, a storage medium in which the program code has been recorded is provided to the computer, and the processor included in the computer reads the program code stored in the storage medium. Here, the program code itself read from the storage medium realizes the functions of the above-described embodiment, and the program code itself and the storage medium storing the program code configure the present invention. Examples of the storage medium for supplying such a program code include a flexible disk, a CD-ROM, a DVD-ROM, a hard disk, a solid state drive (SSD), an optical disk, a magneto-optical disk, a CD-R, and a magnetic tape, a non-volatile memory card, a ROM, and the like.

The program code that realizes the functions described in the embodiment can be implemented in a wide range of programs or script languages such as assembler, C/C++, perl, Shell, PHP, and Java (registered trademark).

In the above-described embodiment, the control lines and information lines indicate those considered necessary for explanation and do not necessarily indicate all the control lines and information lines in the product. All configurations may be interconnected.

What is claimed is:

1. A distributed storage device comprising a plurality of storage nodes, wherein
   the storage node includes a storage device and a processor,
   the plurality of storage nodes have a deduplication function for deduplication between storage nodes,
   the storage device stores files that are not deduplicated in the plurality of storage nodes, duplicate data storage files in which deduplicated duplicate data is stored, and cache data storage files in which cache data of duplicate data stored in another storage node is stored,
   the processor
   discards the cache data when a predetermined condition is satisfied, and
   when a read access request for the cache data is received, reads the cache data if the cache data is stored in the cache data storage file, and requests another storage node to read the duplicate data related to the cache data if the cache data is discarded.

2. The distributed storage device according to claim 1, wherein
   the predetermined condition is that the free space of the storage device in the storage node is small.

3. The distributed storage device according to claim 1, wherein
   the processor discards a part or all of the cache data of the cache data storage file and stores the duplicate data related to the read access request read from the other storage node in the cache data storage file.

4. The distributed storage device according to claim 3, wherein
   a predetermined plurality of files are access units from the server, the predetermined plurality of files in the access unit are distributed and stored in a plurality of storage nodes, and a distributed storage node that stores the files is determined by the storage node, and
   when discarding the cache data storage file, the processor preferentially leaves the cache data of the duplicate data related to the file that is held by the own storage node in the cache data storage file.

5. The distributed storage device according to claim 3, wherein
   a predetermined plurality of files are access units from the server, the predetermined plurality of files in the access unit are distributed and stored in a plurality of storage nodes, and a distributed storage node that stores the files is determined by the storage node, and
   when discarding the cache data, if the cache data to be discarded is a file that configures a part of an access unit, the processor discards the cache data of another file that configures the same access unit as the file.

6. The distributed storage device according to claim 1, wherein when the processor receives a write access request and detects that the data related to the write access request is duplicated with any of the data, the processor performs deduplication and stores the data related to the write access request in the cache data storage file.

7. The distributed storage device according to claim 6, wherein
the processor discards a part or all of the cache data of the cache data storage file and stores the detected duplicate data among the data related to the write access request in the cache data storage file.

8. The distributed storage device according to claim 7, wherein
a predetermined plurality of files are access units from the server, the predetermined plurality of files in the access unit are distributed and stored in a plurality of storage nodes, and a distributed storage node that stores the files is determined by the storage node, and
when discarding the cache data storage file, the processor preferentially leaves the cache data of the duplicate data related to the file that is held by the own storage node in the cache data storage file.

9. The distributed storage device according to claim 7, wherein
a predetermined plurality of files are access units from the server, the predetermined plurality of files in the access unit are distributed and stored in a plurality of storage nodes, and a distributed storage node that stores the files is determined by the storage node, and
when discarding the cache data, if the cache data to be discarded is a file that configures a part of an access unit, the processor discards the cache data of another file that configures the same access unit as the file.

10. The distributed storage device according to claim 1, wherein
when the processor receives a write access request and writes to a file that is not deduplicated, a duplication determination is performed at any timing, and when duplicate data is detected in the written data, the duplicate data is stored in the cache data storage file.

11. The distributed storage device according to claim 10, wherein
the processor discards a part or all of the cache data of the cache data storage file and stores the detected duplicate data among the data related to the write access request in the cache data storage file.

12. The distributed storage device according to claim 11, wherein
a predetermined plurality of files are access units from the server, the predetermined plurality of files in the access unit are distributed and stored in a plurality of storage nodes, and a distributed storage node that stores the files is determined by the storage node, and
when discarding the cache data storage file, the processor preferentially leaves the cache data of the duplicate data related to the file that is held by the own storage node in the cache data storage file.

13. The distributed storage device according to claim 11, wherein
a predetermined plurality of files are access units from the server, the predetermined plurality of files in the access unit are distributed and stored in a plurality of storage nodes, and a distributed storage node that stores the files is determined by the storage node, and
when discarding the cache data, if the cache data to be discarded is a file that configures a part of an access unit, the processor discards the cache data of another file that configures the same access unit as the file.

14. A data management method in a distributed storage device that includes a plurality of storage nodes, wherein
the storage node includes a storage device and a processor,
the plurality of storage nodes have a deduplication function for deduplication between storage nodes,
the storage device stores files that are not deduplicated in the plurality of storage nodes, duplicate data storage files in which deduplicated duplicate data is stored, and cache data storage file in which cache data of duplicate data stored in another storage node is stored,
the cache data is discarded when a predetermined condition is satisfied, and
when a read access request for the cache data is received, the cache data is read if the cache data is stored in the cache data storage file, and another storage node is requested to read the duplicate data related to the cache data if the cache data is discarded.

* * * * *